(12) United States Patent
Sharp et al.

(10) Patent No.: US 9,001,623 B1
(45) Date of Patent: Apr. 7, 2015

(54) SONAR SYSTEMS AND SONAR METHODS THAT USE A TOW BODY HAVING A TOWED ACOUSTIC PROJECTOR FOR WHICH AN ORIENTATION CAN BE CHANGED WHILE BEING TOWED

(75) Inventors: David A. Sharp, Newport, RI (US); Joseph Ricci, Bristol, RI (US); Patrick M. Brogan, Bristol, RI (US); Gregory S. Rosche, North Kingstown, RI (US); Michael A. Gonzalez, Portsmouth, RI (US); James R. Sturges, Tiverton, RI (US); Arthur J. Pedro, Narragansett, RI (US)

(73) Assignee: Raytheon Company, Waltham, MA (US)

( * ) Notice: Subject to any disclaimer, the term of this patent is extended or adjusted under 35 U.S.C. 154(b) by 630 days.

(21) Appl. No.: 13/312,048

(22) Filed: Dec. 6, 2011

(51) Int. Cl.
*G01K 9/00* (2006.01)
*G01S 15/42* (2006.01)

(52) U.S. Cl.
CPC ...................................... *G01S 15/42* (2013.01)

(58) Field of Classification Search
CPC ....................................................... B63B 21/56
USPC ........................... 367/140–176; 114/242–253
See application file for complete search history.

(56) References Cited

U.S. PATENT DOCUMENTS

| | | | |
|---|---|---|---|
| 3,943,482 A | 3/1976 | Murphree et al. | |
| 5,267,223 A * | 11/1993 | Flanagan et al. | 367/159 |
| 5,602,801 A * | 2/1997 | Nussbaum et al. | 367/165 |
| 6,088,296 A * | 7/2000 | Seaman et al. | 367/106 |
| 6,504,792 B2 * | 1/2003 | Barker | 367/20 |
| 7,983,114 B2 * | 7/2011 | Ricard et al. | 367/154 |
| 2006/0254491 A1 * | 11/2006 | Seiple | 114/253 |
| 2008/0056069 A1 * | 3/2008 | Doisy et al. | 367/138 |
| 2008/0268775 A1 * | 10/2008 | Bishop | 455/13.3 |
| 2009/0154295 A1 * | 6/2009 | Ricard et al. | 367/154 |
| 2012/0195162 A1 * | 8/2012 | Borgen et al. | 367/16 |

* cited by examiner

*Primary Examiner* — Isam Alsomiri
*Assistant Examiner* — Hovhannes Baghdasaryan
(74) *Attorney, Agent, or Firm* — Daly, Crowley, Mofford & Durkee, LLP

(57) ABSTRACT

A tow body and associated method have an acoustic projector that can be rotated about a vertical plane while the tow body is being towed through the water. In some embodiments, the tow body and method allow the tow body to be coupled to a tow cable while the tow cable is being towed through the water and under tension.

27 Claims, 14 Drawing Sheets

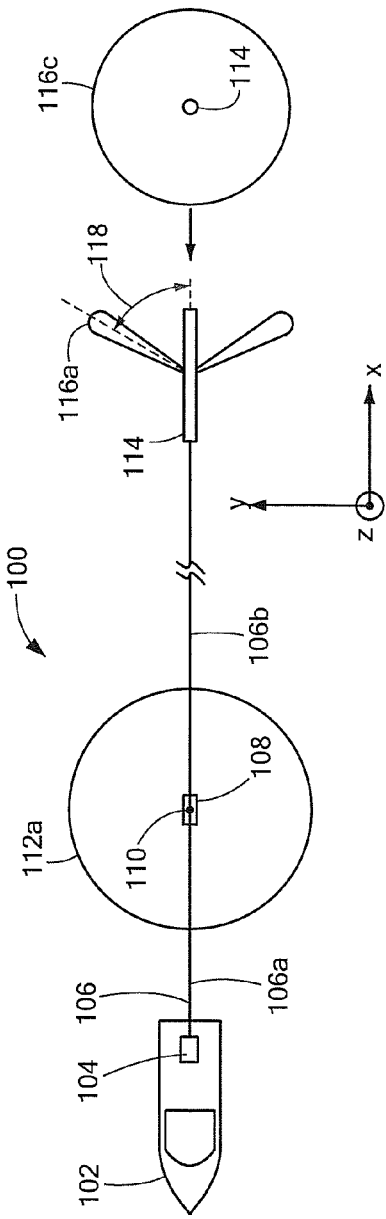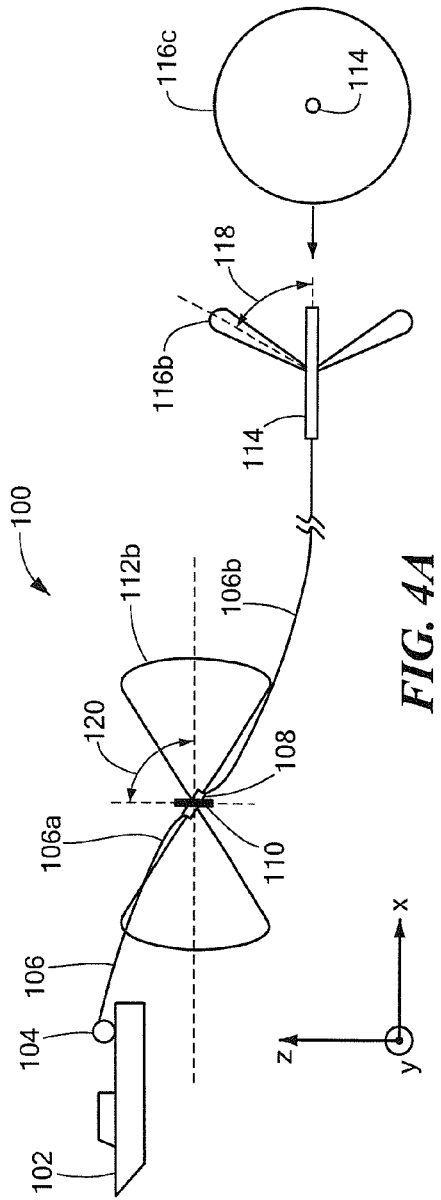
FIG. 4
FIG. 4A

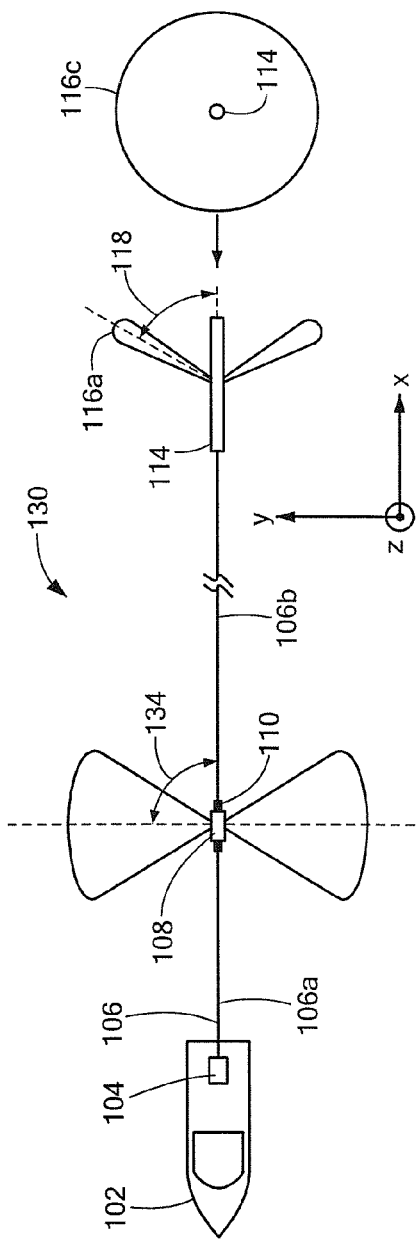
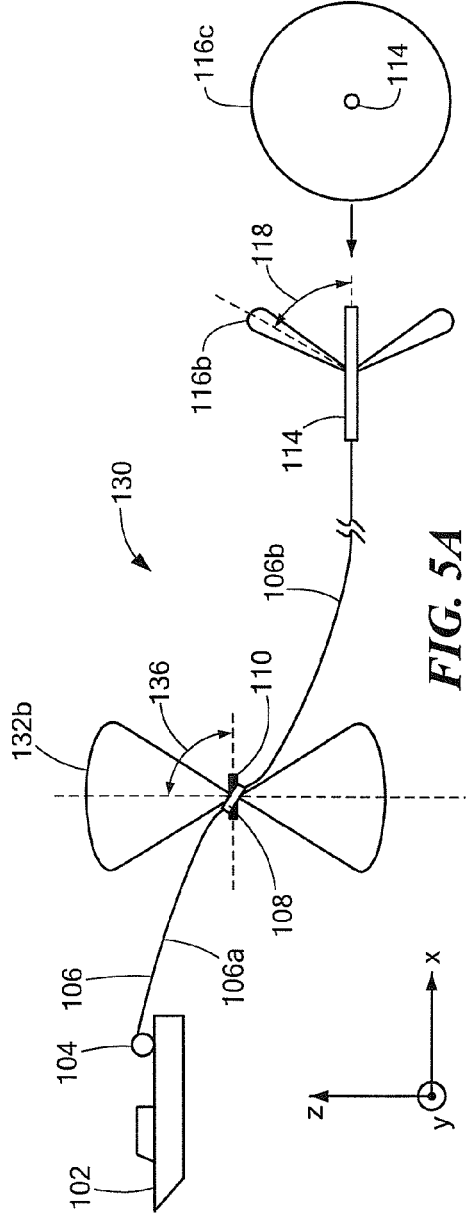
FIG. 5
FIG. 5A

SONAR SYSTEMS AND SONAR METHODS THAT USE A TOW BODY HAVING A TOWED ACOUSTIC PROJECTOR FOR WHICH AN ORIENTATION CAN BE CHANGED WHILE BEING TOWED

FIELD OF THE INVENTION

This invention relates generally to sonar systems and, more particularly, to a sonar system having a towed acoustic projector for which an orientation can be changed while being towed.

BACKGROUND OF THE INVENTION

Some sonar systems employ sonar elements towed by a ship. So-called passive towed sonar systems typically have a towed line array of acoustic receiving elements. The passive towed sonar systems can passively receive sounds radiated by targets, for example, ships or submarines. Typically, the passive towed sonar system has processing capabilities that can, from the received sounds, detect the target, that can localize the target, and that can classify the target.

So-called active towed sonar systems typically have both a towed line array of acoustic receiving elements and also a towed sound source. The active towed sonar systems can generate acoustic pulses with the towed sound source. The sound pulses travel through the water, and impinge upon an object, for example, a ship, submarine, or a mine, creating echoes therefrom. The towed line array of acoustic receiving elements used in the active towed sonar system can receive the echoes from the targets. Typically, the active towed sonar system has processing electronics that can, from the received echoes, detect the target, that can localize the target, and that can classify the target.

Conventional towed active sonar systems us a first winch and a first associated tow cable to tow the line array of acoustic receiving elements and a second winch and a second associated tow cable to tow the towed sound source. Having two winches and two tow cables tends to result in excessive use of ship deck space and also complex deployment techniques.

Furthermore, conventional active towed sonar systems employ acoustic sound sources that tend to project sound omnidirectionally, i.e., in all directions. Thus, the conventional active towed sonar systems can interfere with other active towed sonar systems, or with any type of sonar systems, operating in proximity.

Still further, the conventional active towed sonar systems are unable to be towed at high speeds, particularly at high speeds that would enable the ship towing the active towed sonar system to move rapidly to a new location.

It would be desirable to provide an active towed sonar system that uses less deck space, that has an easier deployment technique, and that can have no loss of detection, localization, and classification of targets. It would also be desirable to provide an active towed sonar system that can operate in proximity to other sonar systems without causing interference into the other sonar systems. It would also be desirable to provide an active towed sonar system that can be towed at high speeds.

SUMMARY OF THE INVENTION

The present invention provides an active towed sonar system that uses less deck space, that has an easier deployment technique, and that can have no loss of detection, localization, and classification of targets. The present invention can provide an active towed sonar system that can operate in proximity to other sonar systems without causing interference into the other sonar systems. The present invention can also provide an active towed sonar system that can be towed at high speeds.

In accordance with one aspect of the present invention, a sonar system includes a tow body for towing through the water. The tow body also includes an outer structure having a length along a major axis and a width less than the length of the outer structure. The tow body also includes an acoustic projector having a length along a major axis and a width less than the length of the acoustic projector. The tow body also includes an axle in a horizontal plane and coupling the acoustic projector to the outer structure, the axle parallel to the width of the acoustic projector. The tow body also includes an actuator mechanism coupled to the acoustic projector and configured to rotate the acoustic projector in a vertical plane about the axle.

In accordance with another aspect of the present invention, a method used in a towed sonar system includes coupling a tow body having an acoustic projector to a tow cable. The method also includes towing the tow body through the water with the tow cable, and rotating the acoustic projector in a vertical plane while the tow body is being towed through the water.

BRIEF DESCRIPTION OF THE DRAWINGS

The foregoing features of the invention, as well as the invention itself may be more fully understood from the following detailed description of the drawings, in which:

FIG. 4 is a top view showing the towed active sonar system of FIG. 1 as towed from a ship, the acoustic projector oriented vertically as in FIG. 2, the acoustic projector generating an omnidirectional horizontal beampattern;

FIG. 4A is a side view showing the towed active sonar system of FIG. 4 as towed from the ship, the acoustic projector generating a directional vertical beampattern;

FIG. 5 is a top view showing the towed active sonar system of FIG. 1 as towed from a ship, the acoustic projector oriented horizontally as in FIG. 3, the acoustic projector generating a directional horizontal beampattern;

FIG. 5A is a side view showing the towed active sonar system of FIG. 5 as towed from the ship, the acoustic projector generating a directional vertical beampattern in one vertical plane, which is omnidirectional in another vertical plane;

DETAILED DESCRIPTION OF THE INVENTION

Before describing the present invention, some introductory concepts and terminology are explained. As used herein, the term "hydrophone" is used to describe a sound receiver that has vertical and horizontal beampatterns that are generally omnidirectional.

As used herein the term "buoyancy," is used to refer to a sum of a gravitation force and a buoyant force. Accordingly, an object that is positively buoyant tends to float or otherwise move upward in the water and an object that is negatively buoyant tends to sink or move downward in the water.

As used herein, the term "center of buoyancy," refers to a point on an object at which it may be considered that a buoyant force acts. Similarly, as used herein, the term "center of gravity" refers to a point on an object at which it may be considered that a gravitational force acts.

It will be understood that, if the center of buoyancy of an object in the water is above a center of gravity of the object, the object will maintain its orientation and is stable, unless another force acts on the object to make it unstable. Conversely, it will be understood that, if the center of buoyancy of an object in the water is below the center of gravity of the object, the object will naturally tend to change its orientation (e.g., flip) and is not stable, unless another force acts on the object to make it stable.

Figure 1:
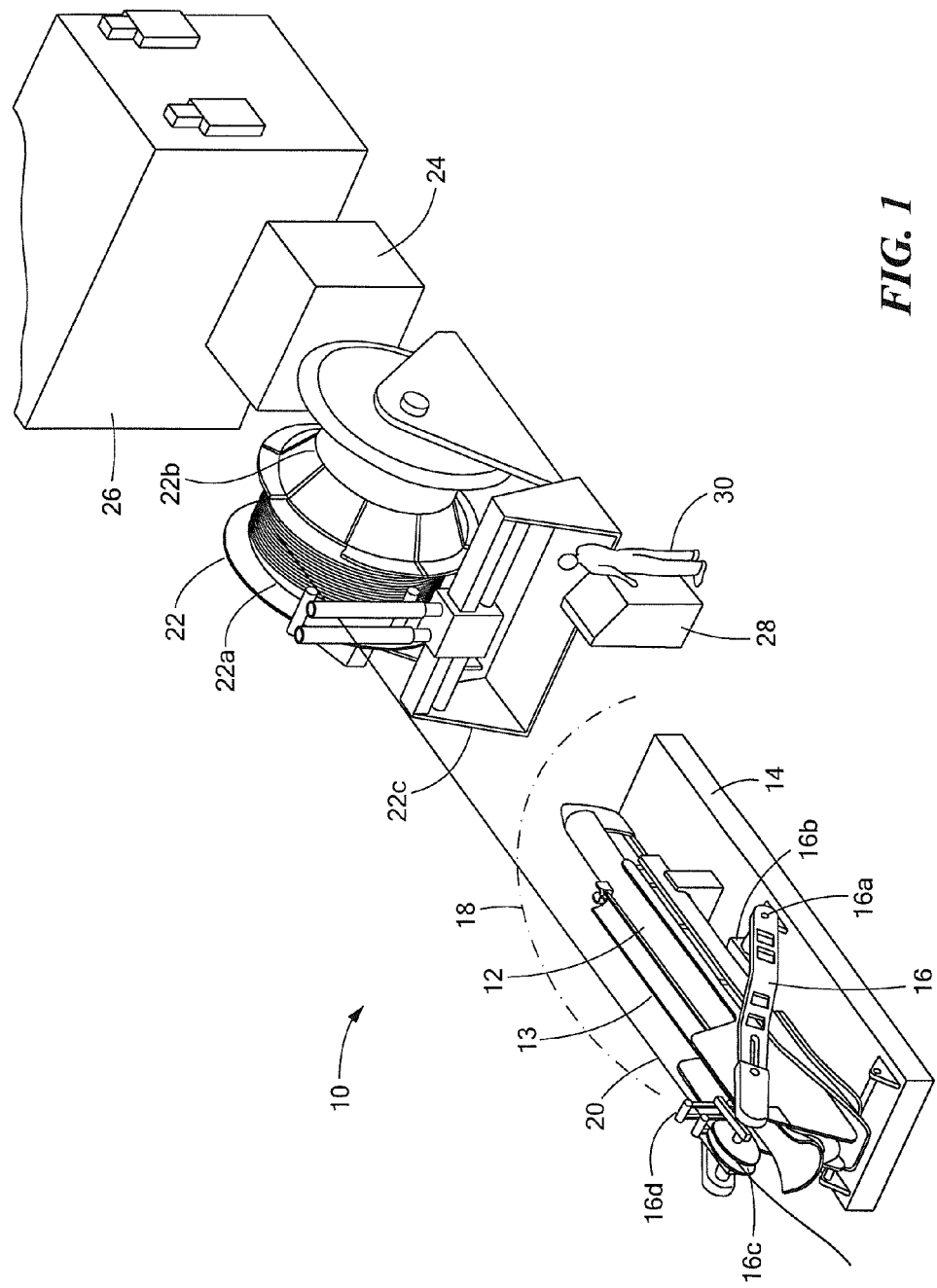
FIG. 1 is a pictorial showing various elements of a towed active sonar system as may be disposed upon the deck of the ship prior to full deployment into the water, the towed active sonar system having a support structure for holding and for releasing a tow body having an acoustic projector therein.

Referring to FIG. 1, an exemplary sonar system 10, shown before it is fully deployed into the water, includes a support structure 14 configured to couple to a deck of a ship (not shown). The support structure 14 can be coupled to the deck of the ship with welds, bolts, or the like. In general, the support structure 14 is mounted near the back end of the ship such that the left-hand side of the support structure 14 as shown is near the stern of the ship.

The support structure 14 can include a movable arm 16 having a pivot or axle 16a about which an end of the arm 16 can move through an arc 18. An actuator mechanism 16b can be coupled to the arm 16 to cause the arm 16 to move. The actuator mechanism 16b can include, for example, an electric motor, or hydraulic actuator. In some embodiments, the movable arm 16 includes two arms that straddle that tow body 12.

The sonar system 10 can also include a tow body 12 configured, at some times, to sit upon and be locked into the support structure 14, and, at other times, to be unlocked from the support structure 14 for deployment into the water.

The sonar system 10 can include a tow cable 20, which, after the receiving array is deployed, can pass over features such as a sheave 16c at the end 16c of the movable arm 16. The moveable arm 16 can include a guide structure 16d configured to further guide the tow cable 20 as described more fully below.

The tow cable 20 is coupled to and deployed by a winch 22. The winch 22 can have first and second coaxial drums 22a, 22b, respectively, which are coupled together. The first drum 22a is configured to receive a first part of the tow cable 20 and the second drum 22b is configured to receive a second part of the tow cable 20.

The winch 22 can include a level winder mechanism 22c.

The sonar system 10 can include a power cabinet 24, a processing station 26, and a user control station 28. Electronic beamforming described more fully below can be performed in the processing station 26.

At the far end of the tow cable 20 (not shown) the sonar system 10 can include the receiving array (not shown) comprised of hydrophone elements.

At some times, a chute 13 can be disposed above the tow body 12. The chute 13 can provide a guide for launching the receiving array (not shown) during early deployment of the sonar system 10. At other times, the chute 13 can be removed.

In some embodiments, the exemplary sonar system 10 can be modular, allowing installation on a wide variety of ships.

Figure 2:
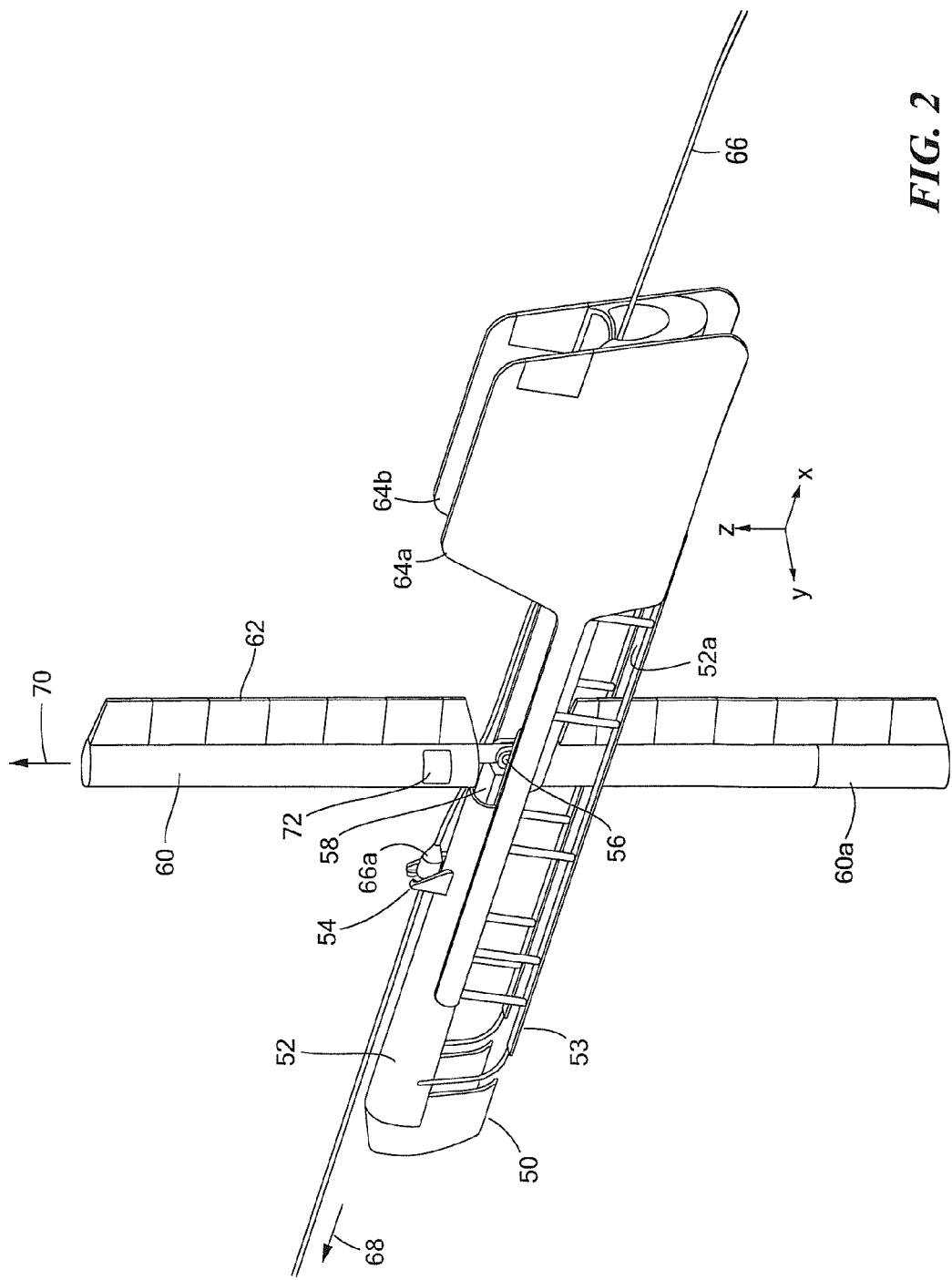
FIG. 2 is a block diagram showing the tow body of FIG. 1, and for which the acoustic projector is oriented vertically.

Referring now to FIG. 2, a tow body 50 can be the same as or similar to the tow body 12 of FIG. 1 but is shown here in a deployed configuration traveling through the water.

The tow body 50 is coupled to a tow cable 66, which can be the same as or similar to the tow cable 20 of FIG. 1. The coupling includes a retention structure 54 upon the tow body 50 for receiving a tow cable retention feature 66a upon the tow cable 88. The tow body 50 and the receiving array described above in conjunction with FIG. 1 can be towed by the same tow cable 66.

The tow body 50 includes an outer structure 52 having a length along a major axis 68 and a width less than the length of the outer structure 52. The tow body 50 also includes an acoustic projector 60 having a length along a major axis 70 and a width less than the length of the acoustic projector. The tow body 50 also includes an axle 56 in a horizontal plane (x-y). The axle 56 couples the acoustic projector 60 to the outer structure 52. The axle 56 is parallel to the width of the acoustic projector 60. The tow body 50 also includes an actuator mechanism 58 coupled to the acoustic projector 60 and configured to rotate the acoustic projector 60 in a vertical plane (x-z) about the axle 56.

The acoustic projector 60 can include a weight 60a at one end thereof to provide stability.

The tow body 50 can include tail fins, for example, two tail fins 64a, 64b configured to result in stability of the tow body 50 as the tow body 50 is towed through the water.

In some embodiments, the length of the acoustic projector 60 along the axis 70 is greater than the width of the outer structure 52 perpendicular to the axis 68. The outer structure 52 can include an opening 52a along its length to allow the acoustic projector 60 to rotate about the axle 56 and pass through the opening 52a.

In some embodiments, the acoustic projector 60 comprises a fairing 62 transparent to sound produced by the acoustic projector 60.

In some embodiments, the actuator mechanism 58 is configured to rotate the major axis 70 of the acoustic projector 60 between horizontal and vertical orientations while the tow body 50 is being towed through the water.

In some embodiments, the tow body 50 further comprises an angle sensor 72 coupled to sense an orientation of the major axis 70 of the acoustic projector 60 relative to vertical. The angle sensor can provide an angle signal either to the tow body 50 or to the processing station 26 of FIG. 1 via the tow cable 66.

In some embodiments, the acoustic projector 60 comprises a plurality of stacked acoustic projectors 60, each capable of receiving a respective separate drive signal resulting in respective separate sound signals projected into water. The acoustic projector is described more fully below in conjunction with FIG. 8.

In some embodiments, the plurality of stacked acoustic projectors 60 includes a plurality of stacked split ring acoustic projectors.

In some embodiments, the above-described separate drive signals have the same frequency and different respective adjustable phases resulting in adjustable beamforming of sound projected into the water by the acoustic projector 60.

In some embodiments, the tow body 50 can include skid rails of which a skid rail 53 is an example.

Figure 3:
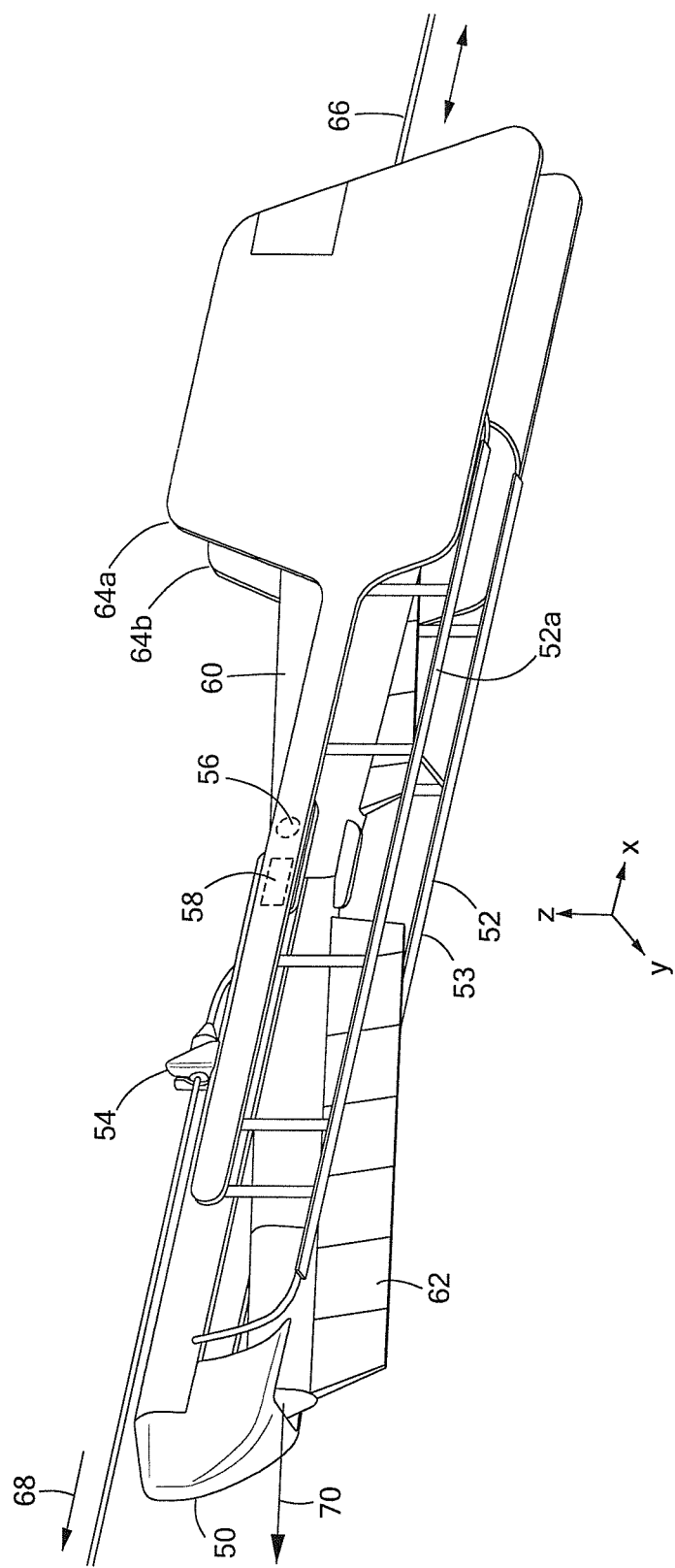
FIG. 3 is a graph showing the tow body of FIGS. 1 and 2, and for which the acoustic projector is oriented horizontally.

Referring now to FIG. 3, in which like elements of FIG. 2 are shown having like reference designations, the acoustic projector 60 has been rotated about the axle 56 by the actuator mechanism 58. The rotation can occur while the tow body 50 is being towed through the water. The major axis 70 of the acoustic projector 60 is shown to be in a horizontal orientation while the major axis 68 of the tow body 50 is not exactly horizontal. It will be understood that, when towed through the water, the major axis 68 of the tow body and the tow cable 66 may take an orientation that is not horizontal.

It is shown that the fairing 62 is directed downward when the major axis 70 of the acoustic projector 60 is disposed in a horizontal orientation. The skid rails, e.g., skid rail 53, can protect the fairing 62, particularly when the tow body 50 is aboard a ship and the major axis 70 of the acoustic projector 60 is aligned with the major axis 68 of the tow body 50.

It will be understood that by rotating the acoustic projector 62 to a vertical orientation (FIG. 2) and to a horizontal orientation (FIG. 3), acoustic beampatterns of sound that can be projected into the water can have a greater variety of beampattern orientations than if the acoustic projector 60 had only one fixed orientation. Beampatterns are discussed below in conjunction with FIGS. 4, 4A, 5 and 5A.

Referring now to FIG. 4, a towing arrangement 100, shown as a top view, is towed from a ship 102. The ship 102 can have a winch 104. The winch 104 can be the same as or similar to the winch 22 of FIG. 1. The towing arrangement 100 includes a tow cable 106. A tow body 108 can be coupled to the tow cable 106. The tow body 108 can be the same as or similar to the tow body 50 of FIGS. 3 and 4. The tow body 108 can include an acoustic projector 110. The acoustic projector 110 can be the same as or similar to the acoustic projector 60 of FIGS. 2 and 3, but is here shown in the vertical orientation of FIG. 2.

The acoustic projector 110 is configured to generate sound into the water. The sound generated into the water is directional and is represented here as a horizontal beampattern 112a. The horizontal beampattern 112a can be substantially omnidirectional in a horizontal x-y plane (axes shown), but can be directional in other planes as shown below in conjunction with FIG. 4A.

The tow cable 106 can include a first portion 106a from the winch 104 to the tow body 108 and a second portion 106b aft of the tow body 108. However, the tow cable 106 can be one contiguous tow cable that includes the first and second portions 106a, 106b, respectively.

The towing arrangement 100 can also include a receiving array 114. The receiving array 114 is configured to receive sound, i.e., echoes of the transmitted sound 112a from an object in the water. The sound is received in directional receive patterns, of which only one horizontal receive beampattern 116a is shown for clarity. However, it should be understood that sound can be received in a plurality of receive beampatterns at the same time. The receiving beampattern 116a forms an angle 118 relative to major axis of the receiving array 114. Other receive beampatterns form other angles relative to the major axis of the receiving array 114. The beampattern 116a is a horizontal pattern in the x-y plane. It should be understood that the beampattern 116a is representative of a slice, thus, the beampattern 116a is actually cone-like. To represent the cone-like nature, a vertical receive beampattern 116c in a y-z plane is shown looking back into the receiving array in the direction of an arrow.

In operation, it should be understood that one transmit beampattern 112a is used to generate one or more acoustic pulses into the water. A plurality of receive beampatterns, like the received beampattern 116a but at a variety of angles, can be used to receive echoes from a variety of pointing directions at the same time or at similar times. As will be understood from the discussion below in conjunction with FIG. 4A, it is also possible to change a direction of the transmitted beampattern for subsequent sound pulses transmitted into the water.

Referring now to FIG. 4A, in which like elements of FIG. 4 are shown having like reference designations, shown from a side view, it can be best seen that the acoustic projector 110 is in a vertical orientation like that shown above in conjunction with FIG. 2. With this orientation of the acoustic projector 110, the acoustic projector 110 generates sound into the water having a directional vertical beampattern 112b in an x-z (vertical) plane. It will be understood that the horizontal beampattern 112a and the vertical beampattern 112b are representative of the same sound transmitted into the water. Essentially, the transmitted sound propagates equally or omnidirectionally in the x-y plane, but is directional in the x-z and y-z planes.

Side lobes are not shown in the beampatterns of FIGS. 4 and 4A for clarity.

A major response axis (MRA) of the vertical beampattern 112b forms an angle 120 with a major axis of the acoustic projector 110. In some aspects of operation, the angle 120 can be ninety degrees. However, via transmit beamforming, other angles are possible between zero and one hundred eighty degrees/

It should be understood that, while one particular beam, represented by beampatterns 112a, 112b is shown, via electronic beamforming, it is possible to steer sound projected into the water to other angles. In other words, the two lobes of the vertical beampattern 112b can both be steered upward or can both be steered downward. Also, by changing an orientation of the acoustic projector 110 away from vertical, the vertical beampattern 112b can be tilted to any angle such that one of the lobes points more upward and one of the lobes points more downward.

Referring now to FIG. 5, in which like elements of FIGS. 4 and 4A are shown having like reference designations, a towing arrangement 130, shown as a top view, is towed from a ship 102. The tow body 108 can include the acoustic projector 110. The acoustic projector 110 can be the same as or similar to the acoustic projector 60 of FIGS. 2 and 3, but is here shown in the horizontal orientation of FIG. 3.

The acoustic projector 110 is configured to generate sound into the water. The sound generated into the water is directional and is represented here as a horizontal beampattern 132a. The horizontal beampattern 132a can be directional in the x-y plane (axes shown), but can be substantially omnidirectional in a vertical y-z plane.

A major response axis (MRA) of the horizontal beampattern 132a forms an angle 134 with a major axis of the acoustic projector 110. In some aspects of operation, the angle 134 can be ninety degrees. However, via transmit beamforming, other angles are possible between zero and ninety degrees/

Referring now to FIG. 5A, in which like elements of FIGS. 4, 4A, and 5 are shown having like reference designations, shown from a side view, the acoustic projector 110 is in a horizontal orientation like that shown above in conjunction with FIG. 3. With this orientation of the acoustic projector 110, the acoustic projector 110 generates sound into the water having a vertical beampattern 132b in the x-z plane. It will be understood that the horizontal beampattern 132a and the vertical beampattern 132b are representative of the same sound transmitted into the water. Essentially, the transmitted sound propagates equally or omnidirectionally in the y-z plane, but is directional in the x-y and x-z planes.

A major response axis (MRA) of the vertical beampattern 132b forms an angle 136 with a major axis of the acoustic projector 110. In some aspects of operation, the angle 136 can be ninety degrees. However, via transmit beamforming, other angles are possible between zero and one hundred eighty degrees. In other words, the two lobes of the beampatterns 132a, 132b can both be steered more away the ship or more toward the ship. Also, by changing an orientation of the acoustic projector 110 away from horizontal, the beampatterns 132a, 132b can be tilted to any angle such that one of the lobes points more away from the ship and the other points more toward the ship.

Side lobes are not shown in the beampatterns of FIGS. 5 and 5A for clarity.

In some situations, the towing arrangement 130 of FIGS. 5 and 5A, for which the acoustic projector 108 is horizontal, has advantages over the towing arrangement 100 of FIGS. 4 and 4A, for which the acoustic projector 108 is vertical. In particular, when one or more towed sonar systems are operating in the same area, as may be towed from separate ships, it may be desirable to have transmit beampatterns such as those shown in FIGS. 5 and 5A in order to avoid directing high-power sound directly at the receiving array of another towed sonar system. If such sound were directly received by a receiving array of another towed sonar system, the directly received sound could overwhelm the lower amplitude echoes that the other sonar system is attempting to receive and process. Such is also true for other types of sonar systems operating in the area.

It should also be understood that, when the acoustic projector is horizontally oriented, the towed sonar system can be towed rapidly through the water, for example, in situations where the ship 102 must rapidly move to a new location for towing.

It should be understood that it is possible to change the orientation of the acoustic projector 110 from vertical to horizontal, from horizontal to vertical, and to any angle between horizontal and vertical while the towed sonar system is being towed through the water. Thus the direction of the transmitted sound can be changed at any time to accommodate the presence of other sonar systems in the area. Transmit beam steering can also be used to avoid other sonar systems.

Figure 6:
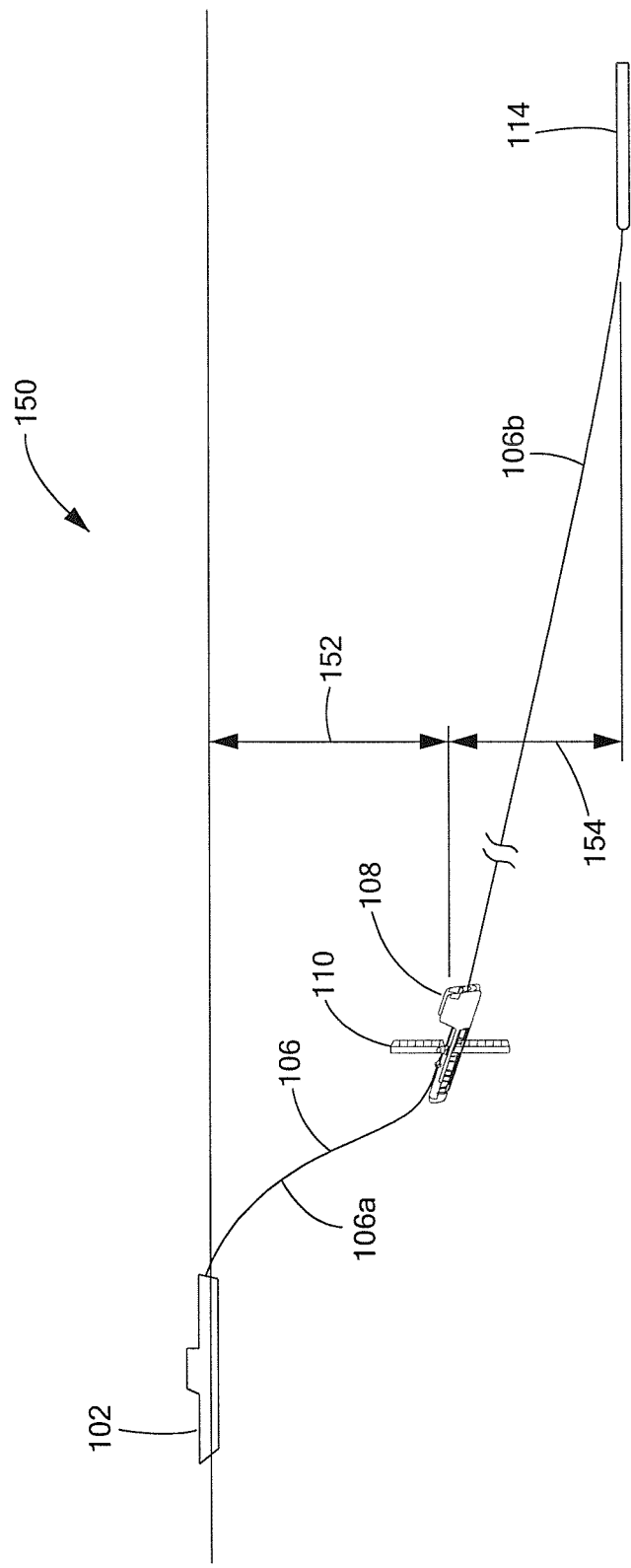
FIG. 6 is a side view showing the towed active sonar system of FIG. 1 as towed from a ship, the acoustic projector and a receiving array having different depths when under tow.

Referring now to FIG. 6, in which like elements of FIGS. 4, 4A, 5, and 5A are shown having like reference designations, when being towed through the water, a towed sonar arrangement 150 has the towed body 108 at a depth 152 and the receiving array 114 at a depth 152+154. It will be understood that the depths vary in accordance with the speed with which the ship 102 is traveling. In general, the depths are shallower when the ship 102 is traveling faster, and the depths are deeper when the ship 102 is traveling slower.

In order to achieve stability of the tow body 108 as the tow body 108 is towed through the water at a variety of speeds, the tow body 108 has a variety of stabilizing characteristics. For example, the tow body 108 can be designed such that, regardless of the orientation of the acoustic projector 110, a center of buoyancy of the tow body 108 is above a center of gravity of the tow body 108. In other words, the tow body 108 is made to be heavier at the bottom than at the top of the tow body 108. To this end, the tow body 108 can include the weight 60a at the end of the acoustic projector 60 of FIG. 2. For another example, the tow body 108 can have one or more tail fins. The tail fins 64a, 64b can be seen more clearly in FIGS. 2 and 3, where two tail fins are shown, the two tail fins allowing the acoustic projector 60 (FIGS. 2, 3) to rotate between the two tail fins. For another example, the tow body 108 can be disposed under the tow cable, i.e., the retention structures described above can be on the top of the tow body 108. For another example, fairing, for example, the fairing 62 of FIG. 2, can be disposed upon the acoustic projector 110, and can reduce turbulence and associated buffeting that might otherwise occur, particularly when the acoustic projector 110 is oriented to the vertical position.

Figure 7:
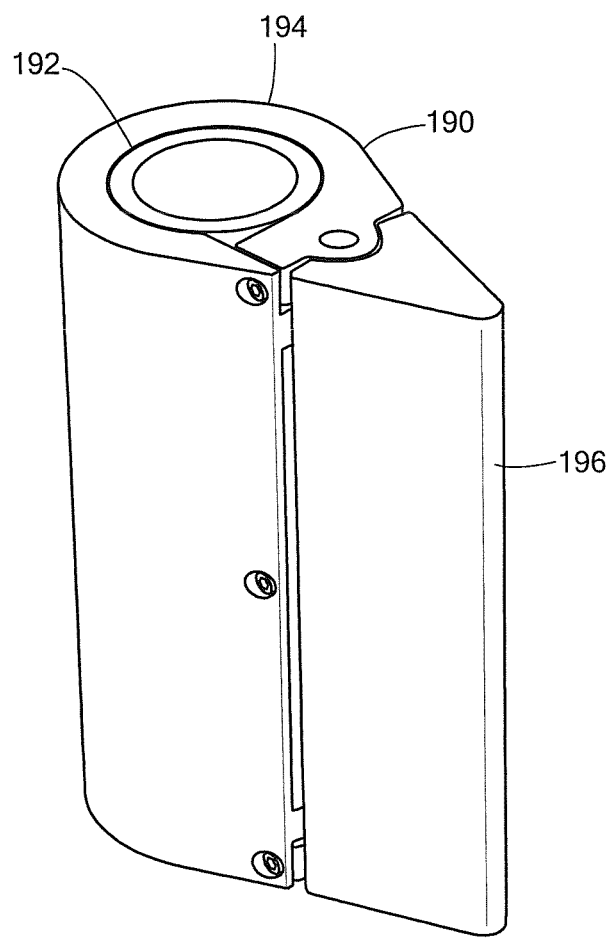
FIG. 7 is a pictorial showing one element of a plurality of stacked acoustic elements of the acoustic projector of FIG. 1.

Referring now to FIG. 7, a portion 190 of an acoustic projector (e.g., 110, FIGS. 4, 4A, 5, 5A, 6) can include a transmitting element 192 within an outer shell 194. An acoustically transparent fairing 196 can be coupled to the outer shell 194. The fairing can be made from a variety of materials, including, but not limited to urethane and a variety of plastics.

The portion 190 can represent a portion of one of a variety of types of acoustic projectors. For example, in one embodiment, the portion 190 comprises a split ring transducer.

The split ring transducer can be of a type described in U.S. Pat. No. 7,719,926, issued May 18, 2010, and assigned to the assignee of the present invention, which is incorporated by reference herein in its entirety.

In some embodiments, a plurality of split ring transducer elements can be stacked and joined with bolts or the like to form the above-described acoustic projectors 60, 110 as longer combined assemblies. In some aspects of operation, each one of the plurality of split ring transducer elements can be driven with drive signals that are in phase. When driven in phase, transmit beampatterns generated by the longer combined assembly are like those shown above in conjunction with FIGS. 4, 4A, 5, 5A. As described above, in other aspects of operation, the transmit beams can be steered using transmit beamforming, in which case drive signals to each one of the split ring transducer elements in the longer combined assembly can be at different phases.

In some other embodiments, the portion 190 is a flextensional transmitting element. In other embodiments the portion 190 is a cylindrical ceramic transmitting element. Other transmitting elements are possible.

As with the split ring transducer elements, flextensional transmitting elements and cylindrical ceramic transmitting elements can be stacked and joined to form longer combined assemblies, respectively. Transmit beamforming can also be done with these longer combined assemblies.

In general, a beam width of the transmit beampattern, for example the transmit beampatterns 112b, 132a, 132b of FIGS. 4A, 5, and 5B, is influenced by the length of the longer combined assembly and also by the transmit frequency of the longer combined assembly. In some embodiments, the acoustic projectors described above operate in a mid-frequency range between about 1 kHz and about 5 kHz. In some embodiments, the length of the combined acoustic projector is about four meters and the width is about 0.2 meters.

Because the fairing 196 is relatively soft and subject to damage, the tow body includes the rails 53 shown above in conjunction with FIGS. 2 and 3. When the tow body 50 of FIGS. 2 and 3 is transported or launched, the fairing 62 FIGS. 2 and 3 is protected by the rails 53.

It is desirable to be able to use the receiving array 114 of FIGS. 4-6 without the tow body 108 in some operational circumstances. In some embodiments, the receiving array 114 is a conventional receiving array used with conventional towed sonar systems for which, as described above, a transmitting assembly is deployed from a separate winch on a separate tow cable.

The receiving array is conventionally towed hundreds or thousands of meters behind a ship, and is not easily or quickly recovered back onto the ship. Thus, it is desirable to be able to attach the tow body 108 while the receiving array 114 is already being towed through the water. FIGS. 8-14 show a variety of features and functions that make it possible to couple the tow body 108 to the tow cable 106 (FIGS. 4, 4A, 5, 5A) while the receiving array 114 (FIGS. 4, 4A, 5, 5A) is being towed through the water.

Figure 8:
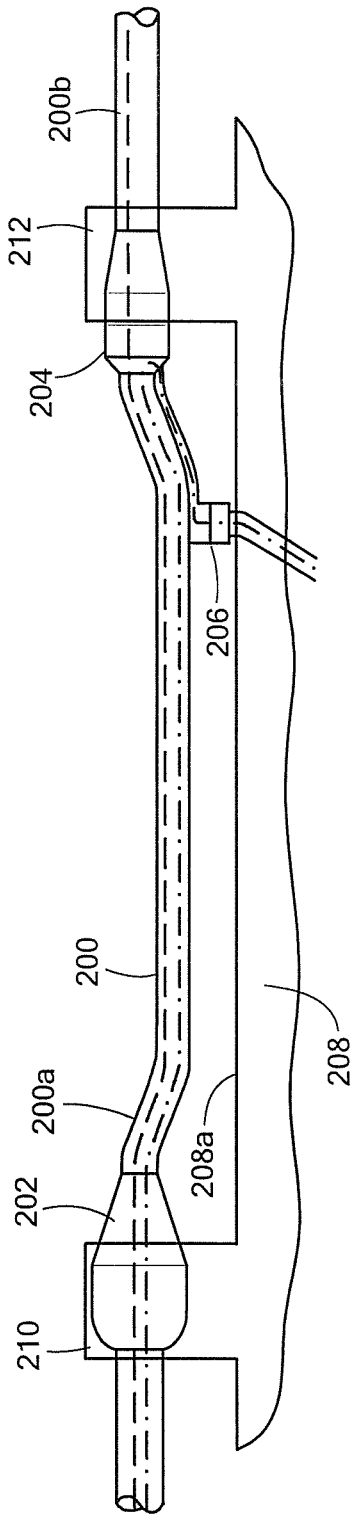
FIG. 8 is a pictorial showing a portion of a tow body, for example, the tow body of FIG. 1, the tow body having two retention structures, and also showing a tow cable having two tow cable retention features configured to be received by and retained by the two tow cable retention structures.

Referring now to FIG. 8, a tow body 208 can be the same as or similar to the tow body 12 of FIG. 1, the tow body 50 of FIGS. 2 and 3, or the tow body 108 of FIGS. 4-6. The tow body 208 has a top surface 208a when the tow body 208 is towed through the water or when the tow body 208 is within a support structure, for example, the support structure 14 of FIG. 1.

The top surface 208a is part of an outer structure part of the tow body 208. The top surface 208a can have two tow cable retention structures 210, 212 for receiving respective retention features 202, 204 on a tow cable 200. The tow cable 200 can be the same as or similar to the tow cable 66 of FIGS. 2 and 3 and the tow cable 106 of FIGS. 4-6.

The two tow cable retention structures 210, 212 can have openings (not shown) in upper regions thereof so that the tow cable 200 and tow cable retention features 200a, 200b can be inserted into the retention structures 210, 212 and can be removed from the retention structures 210, 212.

The tow cable 200 can have a first part 200a and a second part 200b, which are contiguous parts. The first part 200a has communication couplings to the acoustic projector within the tow body 208 and the second part 200b has communication couplings to the receiving array at the end of the tow cable 200. The first part 200a also has communication couplings to the receiving array if the end of the tow cable 200, which pass through the first part. Communication couplings can include a variety of types of communication couplings, including, but not limited to, wire couplings and fiber-optic couplings.

The tow cable 200 can include a connector 206 for coupling to the acoustic projector within the tow body 208.

It should be apparent that the tow body 208 can be coupled to the tow cable 200 or decoupled from the tow cable 200 at any time, including, but not limited to, when the tow cable 200 is towing the receiving array (not shown) through the water.

Figure 8A:
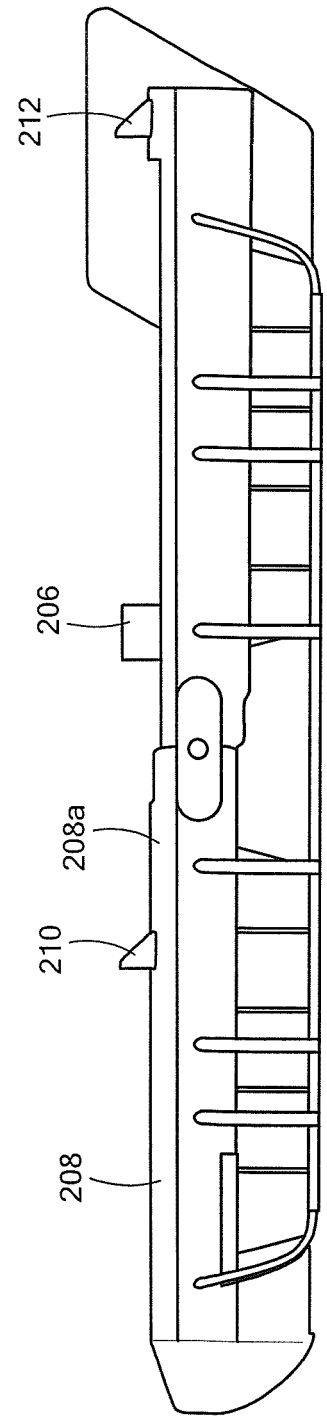
FIG. 8A is a pictorial showing the tow body of FIG. 8.

Referring now to FIG. 8A, the tow body 208 is shown with the two retention structures 210, 212 and with the connector 206.

Figure 9:
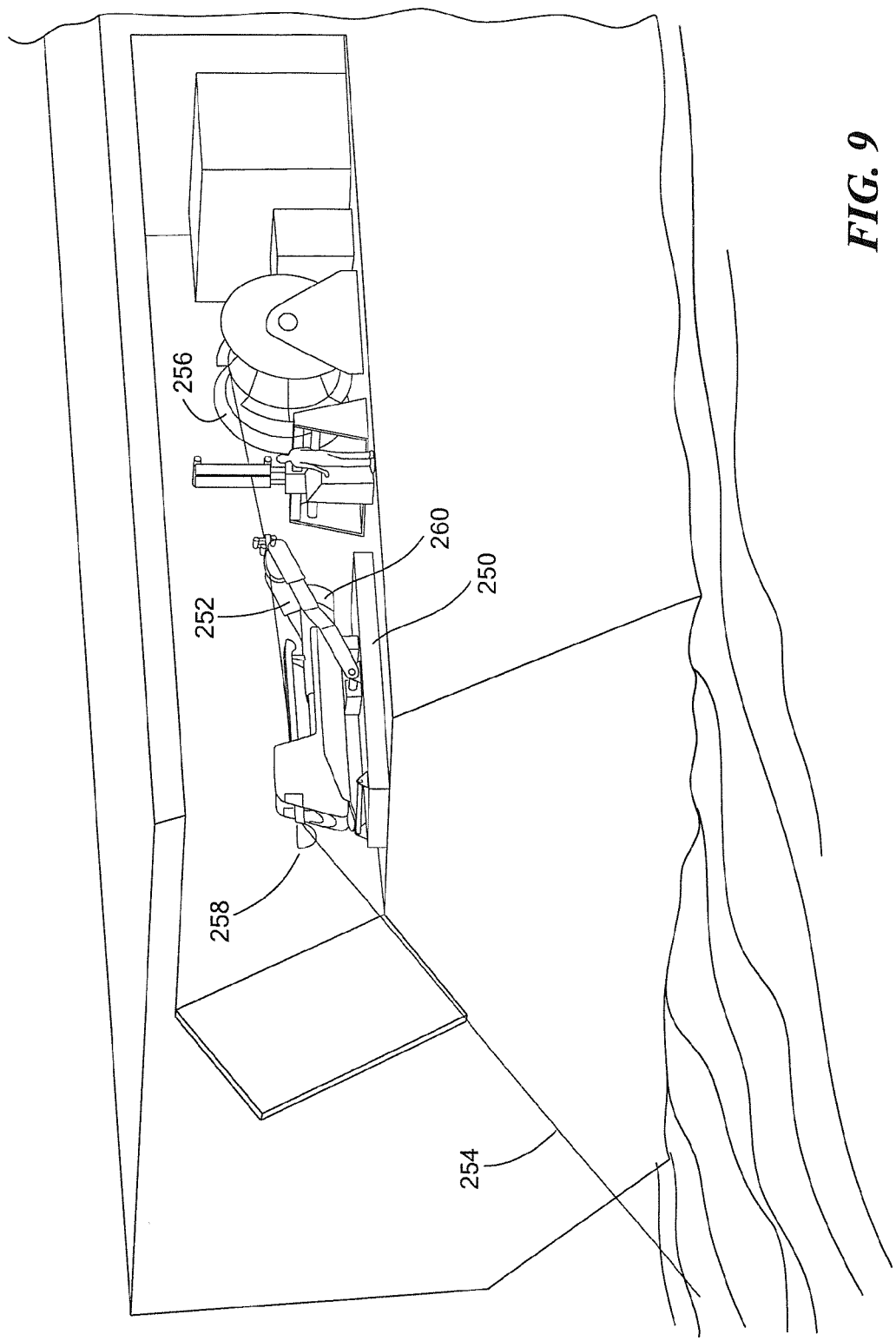
FIG. 9 is a pictorial showing the support structure and the tow body of FIG. 1, the support structure having a movable arm in a position during early deployment of the towed active sonar system.
Figure 10:
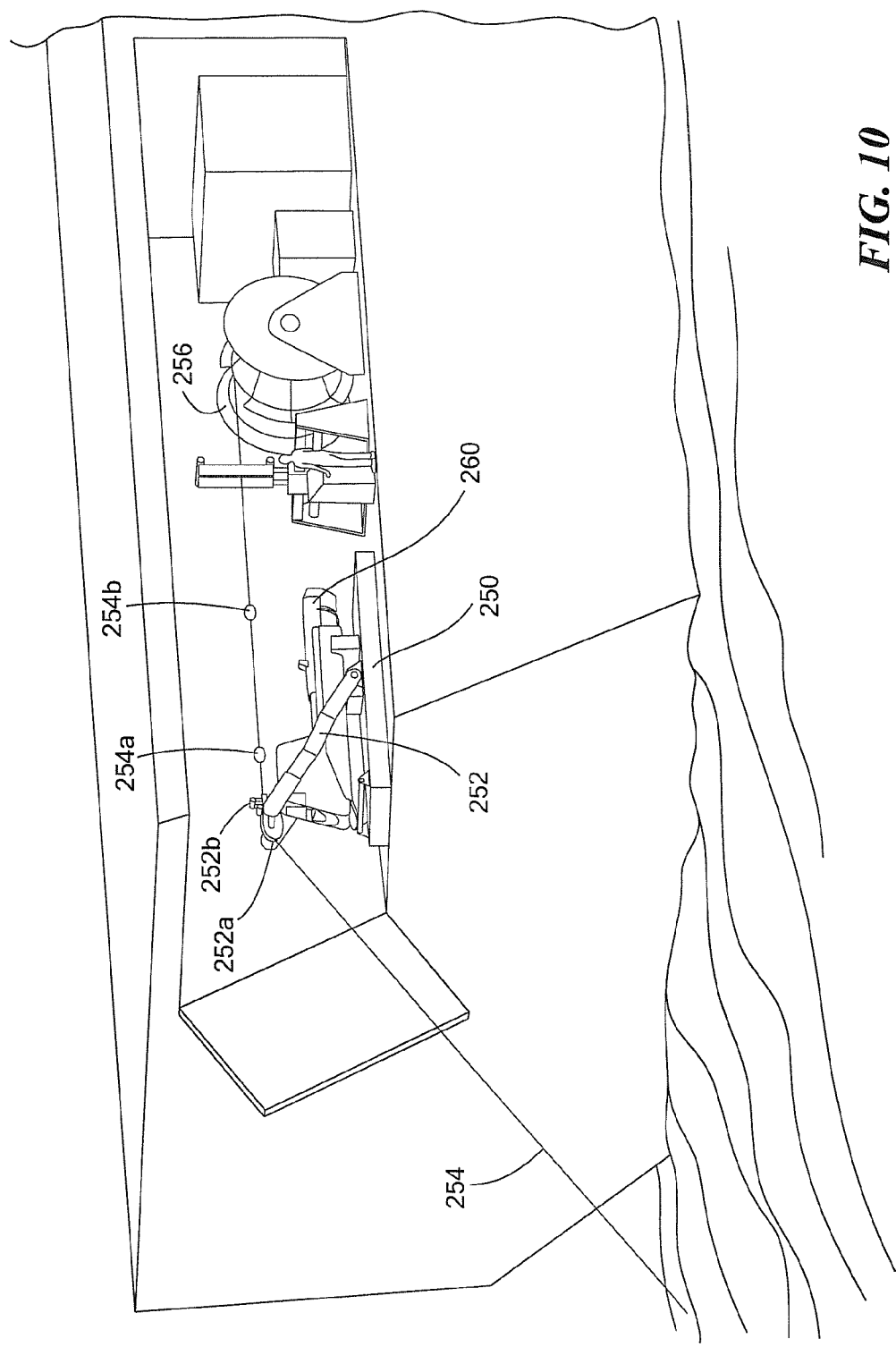
FIG. 10 is a pictorial showing the support structure and the tow body of FIG. 9, the movable arm in a position to begin coupling the tow body of FIG. 1 to a tow cable while the tow cable is being towed through the water, the towing resulting in tension upon the tow cable.
Figure 11:
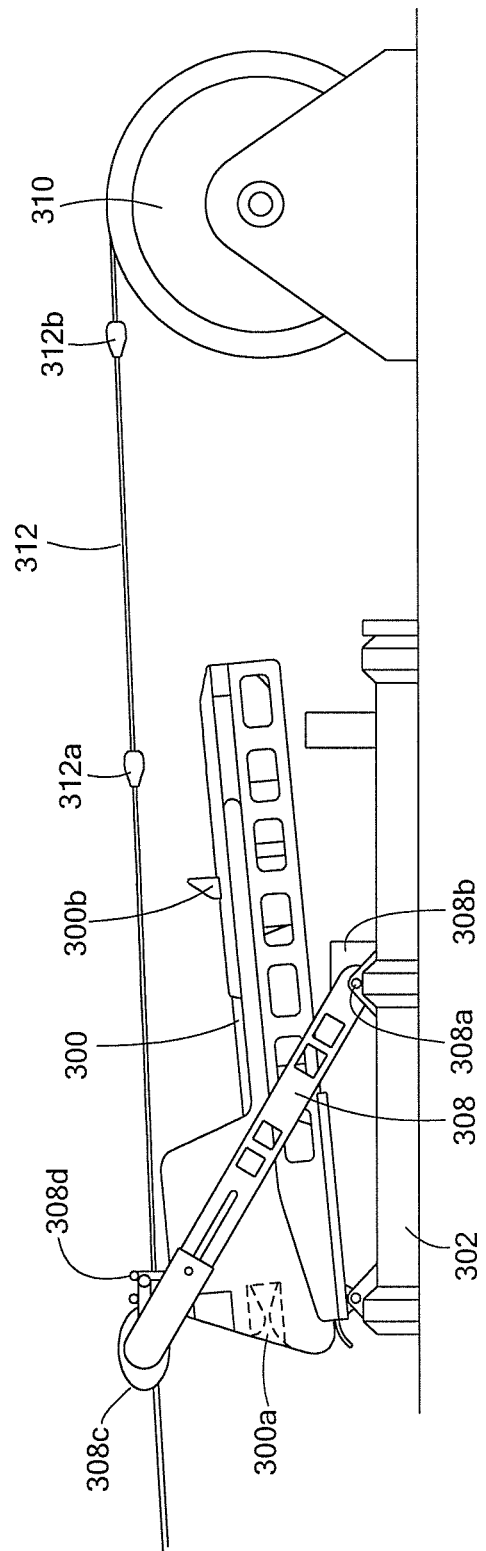
FIG. 11 is a pictorial showing the support structure and the tow body of FIGS. 9 and 10, the movable arm in the position to begin coupling the tow body of FIG. 1 to the tow cable as in FIG. 10 while the tow cable is being towed through the water.

FIGS. 9-11 are representative of a sequence of operations that can be used to deploy the above-described tow body upon a tow cable already being towed through the water.

Referring now to FIG. 9, from a winch 256, a tow cable 254 having a receiving array at the far end (not shown) can be deployed up and over a support structure 250 having a movable arm 252. The support structure 250 can be the same as or similar to the support structure 14 of FIG. 1 and a movable arm 252 can be the same as or similar to the movable arm 16 of FIG. 1.

In the support structure 250 can be disposed a tow body 260 the same as or similar to the tow bodies described above. A chute 258 can be placed upon the tow body 260, or can otherwise be a part of the tow body 260, through which the tow cable 254 and the receiving array can slide during deployment of the receiving array. The chute 258 can be the same as or similar to the chute 13 of FIG. 1. The arrangement of FIG. 9 can be representative of a first step in the deployment of the towed sonar system, during which the receiving array is deployed through the chute 258.

Referring now to FIG. 10, in which like elements of FIG. 9 are shown having like reference designations, the tow cable 254 has been deployed far enough so that two tow cable retention features 254a, 254b are near the support structure 250. The two tow cable retention features 254a, 254b can be the same as or similar to the tow cable retention features 202, 204 of the tow cable 200 of FIG. 8.

The movable arm 252 can include a sheave 252a and a guide structure 252b at an end thereof. Thus the movable arm 252 can be moved to the position shown and the winch 256 can be controlled, by an operator via the above described actuator mechanism 16b of FIG. 1, to guide the tow cable retention features 254a, 254b of the tow cable 254, into retention structures upon the tow body 260.

Referring now to FIG. 11, a support structure 302 holds a tow body 300 before the tow body is launched into the water. The support structure 302 can be the same as or similar to the support structure 14 of FIG. 1 and to the support structure 250 of FIGS. 9 and 10. The tow body 300 can be the same as or similar to the tow body 12 of FIG. 1 and to the tow body 260 of FIGS. 9 and 10.

A tow cable 312 includes first and second retention features 312a, 312b. The tow cable 312 can be the same as or similar to the tow cable 20 of FIG. 1 and to the tow cable 254 of FIGS. 9 and 10. The tow cable retention features 312a, 312b, can be the same as or similar to the tow cable retention features 254a, 254b of FIG. 10.

The support structure 302 includes a movable arm 308, which can have a sheave 308c and a guide structure 308d at an end thereof. The sheave 308c and the guide structure 308d are configured to guide the two tow cable retention features 312a, 312b into retention structures 300a 300b, respectively, upon the tow body 300.

The moveable arm 308 can pivot about an axle 308a by way of an actuator mechanism 308b. The axle 308a and the actuator mechanism 308b can be the same as or similar to the axle 16a and the actuator mechanism 16b of FIG. 1. The moveable arm 308 is moved to the position shown above in conjunction with FIG. 10.

In some embodiments, the actuator mechanism 308b can also tilt the towed body 300 as shown to facilitate guiding the two tow cable retention features 312a, 312b into the two retention structures 300a 300b, respectively, upon the tow body 300.

In some embodiments, an operator can control a position of the movable arm 308 and can control a winch 310 to move the retention features 312a, 312b into the retention structures 300a, 300b. However, in other embodiments, movement of the movable arm 308 and movement of the winch 310 are automatically controlled.

The tow body 300 can include the first and second retention structures 300a, 300b. The first and second retention structures 300a, 300b can be the same as or similar to the retention structures 210, 212 of FIG. 8.

When the tow cable retention feature 312a is within the retention structure 300a, then the tow body 300 retains the tow cable 312, and tension of the tow cable 312 is held by the tow body 300.

It should be appreciated that the movable arm 308 can be pivoted, for example, by the actuator mechanism 308b. The sheave 308c and the guide structure 308d at the end of the movable arm 308 are configured to guide the tow cable retention features 312a, 312b into the retention structures 300a and 300b.

Figure 12:
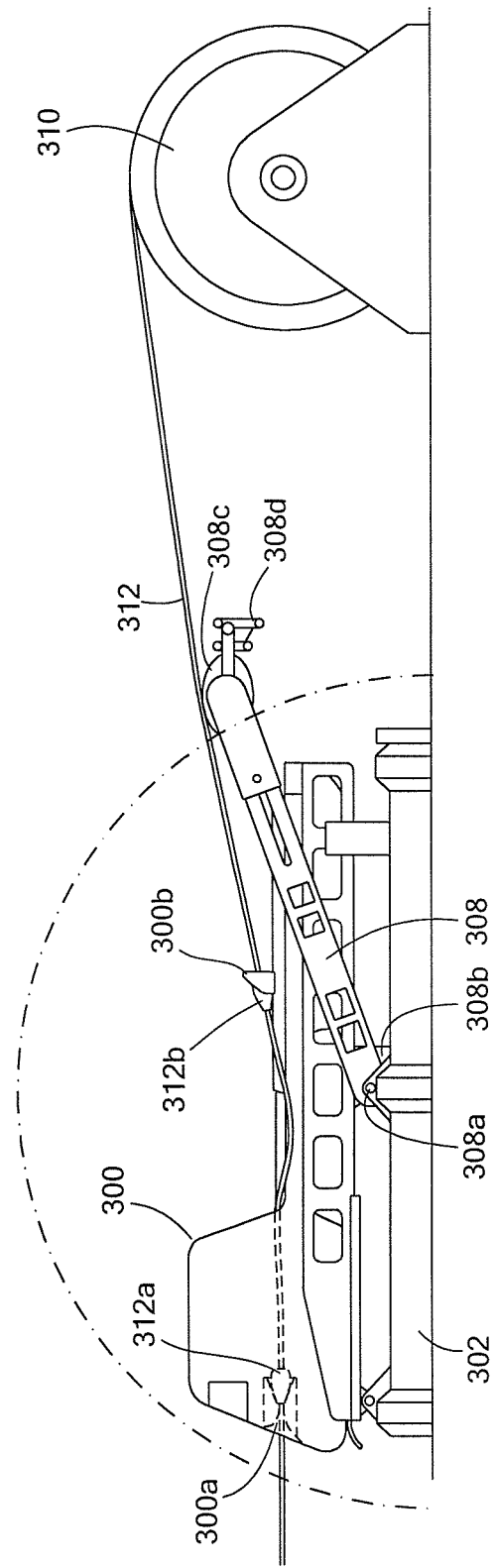
FIG. 12 is a pictorial showing the support structure and the tow body of FIGS. 9-11, the movable arm in the position after coupling the tow body of FIG. 1 to the tow cable.

Referring now to FIG. 12, in which like elements of FIG. 11 are shown having like reference designations, here the movable arm 308 has pivoted toward the winch 310 causing the retention feature 312a to be retained within the retention structure 300a and causing the retention feature 312b to be retained within the retention structure 300b. Thus, the tow cable is now locked into the tow body 300 and the tow body 300 remains locked into the support structure 302, which is securely coupled to the ship. The tow cable 300 can be somewhat slack between the two tow cable retention features 312a, 312b. At this time, a connector (not shown) carrying communication links from the tow cable 312 can be manually coupled to the tow body 300. The connector can be the same as or similar to the connector 206 of FIG. 8.

The tow body 300 now carries the load of the tow cable 312 until the tow body 300 is released from the support structure 302 into the water, during which time, the winch 310 again carries the load so that the tow body 300 can be released into the water in a controlled fashion under winch control. To affect the release of the tow body 300, the support structure 302 can include an electrically or hydraulically actuated release mechanism (not shown).

Figure 13:
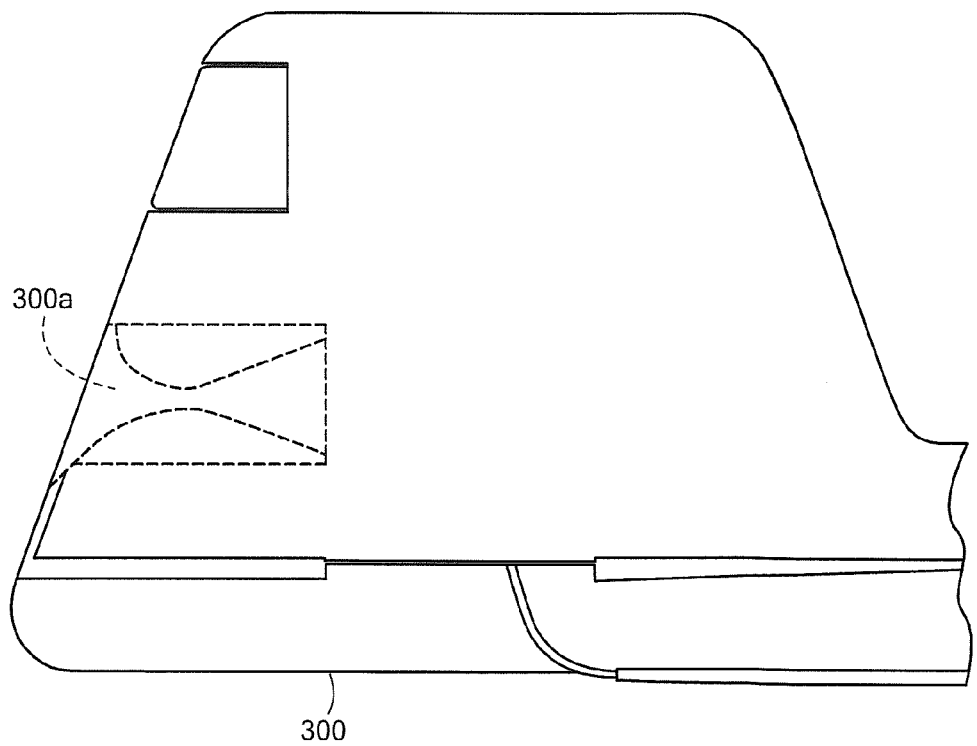
FIG. 13 is a pictorial showing a portion of the tow body and one of the retention structures of the tow body of FIGS. 9-12 that allows coupling of a tow cable to the tow body.

Referring now to FIG. 13, in which like elements of FIGS. 11 and 12 are shown having like reference designations, the tow body 300 includes the retention structure 300a on a back end of the tow body 300. The retention structure 300a can be cone-like and can be configured to receive a tow cable retention feature, for example, the tow cable retention feature 312a of the tow cable 312 of FIGS. 11 and 12. The retention structure 300a can be the same as or similar to the retention structure 212 of FIGS. 8 and 8A.

Figure 14:
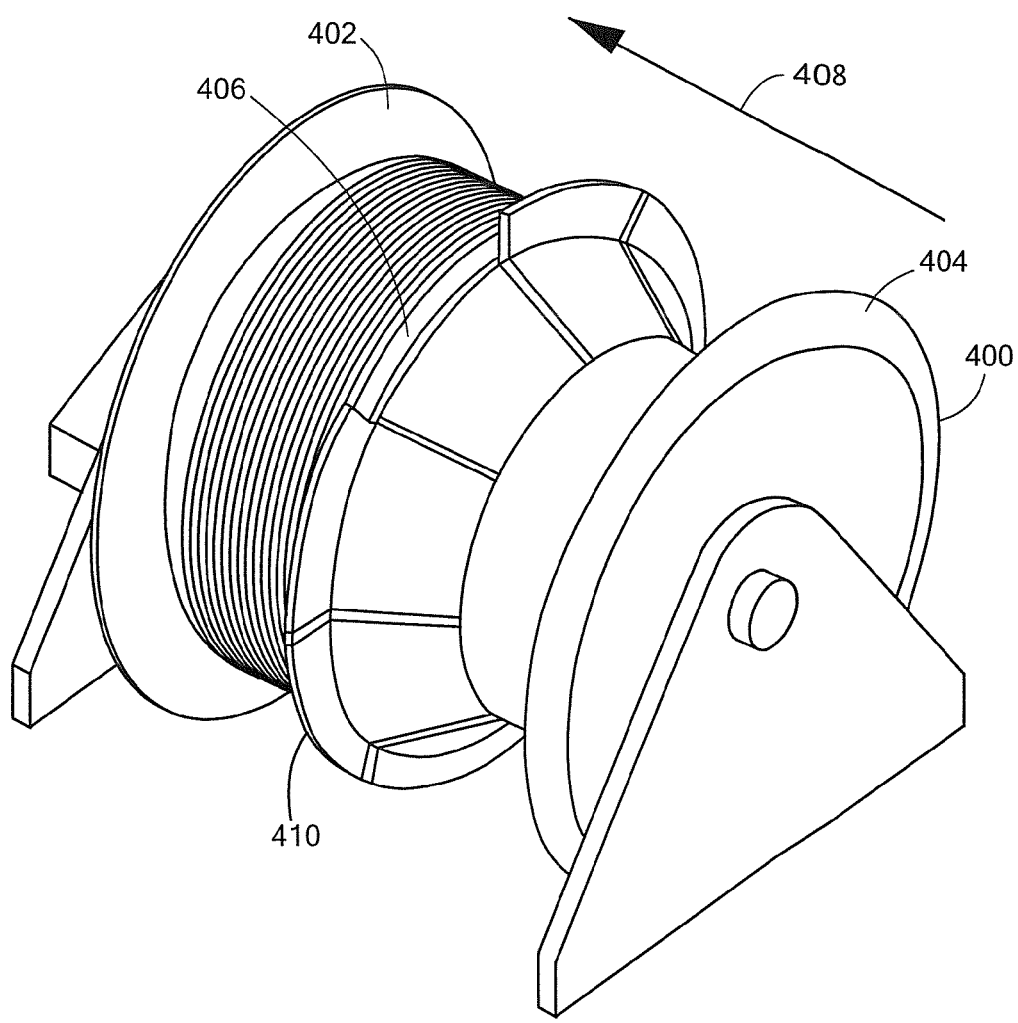
FIG. 14 is a pictorial of a winch having two coaxial winch spools suitable for use in the active towed sonar system of FIG. 1.

Referring now to FIG. 14, a winch 400 can be the same as or similar to the winch 22 of FIG. 1 and to the winch 310 of FIGS. 11 and 12. As described above, the tow cable used herein has a first part and a second part. The first part has communication couplings to the acoustic projector. The second part has communication couplings to the receiving array at the far end of the tow cable. The communication couplings of the second part pass through the first part of the tow cable. Thus, the first part of the tow cables tends to be larger in diameter than the second part of the tow cable.

Accordingly, the winch 400 can have two winch drums 402, 404. The winch drum 402 is configured to hold the first part of the tow cable, i.e., that part of the tow cable that holds the communication links to the acoustic projector of the tow bodies described herein. The winch drum 404 is configured to hold the second part of the tow cable, i.e. that part of the tow cable that holds the communication links to the receiving array. It will be understood that the second part of the tow cable held in the winch drum 404 is deployed first into the water. The tow cable is contiguous. The tow cable must pass from the drum 404 to the drum 402 in a direction of an arrow 408 when the tow cable is being deployed, and the tow cable must pass from the drum 402 to the drum 404 when the tow cable is being recovered. Thus, a passage or opening 406 is provided between the two winch drums 402, 404, which allows the tow cable, when still under tension, to pass between the two winch drums 402, 404.

In some embodiments, the two winch drums 402, 404 can be aligned coaxially on the same axle and can spin together at the same speed using the same electric motor or hydraulic system.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A sonar system, comprising:
a tow body for towing through the water, the tow body comprising:
an outer structure having a length along a major axis and a width less than the length of the outer structure;
an acoustic projector having a length along a major axis and a width less than the length of the acoustic projector;
an axle in a horizontal plane and coupling the acoustic projector to the outer structure, the axle parallel to the width of the acoustic projector; and
an actuator mechanism coupled to the acoustic projector and configured to rotate the acoustic projector in a vertical plane about the axle; wherein the sonar system further comprises:
a tow cable comprising two tow cable retention features, wherein the outer structure comprises two tow cable retention structures for receiving the two tow cable retention features, respectively; and
a support structure for coupling to a ship and for holding the tow body before it is deployed into the water, wherein the support structure comprises a movable arm, wherein, by movement of the movable arm, the movable arm is configured to guide the two tow cable retention features into respective ones of the two tow cable retention structures of the outer structure.

2. The sonar system of claim 1, wherein the length of the acoustic projector is greater than the width of the outer structure, wherein the outer structure comprises an opening to allow the acoustic projector to rotate about the axle and pass through the opening.

3. The sonar system of claim 1, wherein the acoustic projector comprises a fairing transparent to sound produced by the acoustic projector.

4. The sonar system of claim 1, wherein the actuator mechanism is configured to rotate the major axis of the acoustic projector between horizontal and vertical orientations, in both of two rotation directions, while the tow body is being towed through the water.

5. The sonar system of claim 4, wherein, when the acoustic projector is horizontal, the acoustic projector is configured to generate a directional horizontal beampattern, and when the acoustic projector is vertical, the acoustic projector is configured to generate an omnidirectional horizontal beampattern.

6. The sonar system of claim 4, wherein the acoustic projector comprises a plurality of stacked acoustic projectors, each capable of receiving a respective separate drive signal resulting in respective separate sound signals projected into water.

7. The sonar system of claim 6, wherein the plurality of stacked acoustic projectors comprises a plurality of stacked split ring acoustic projectors.

8. The sonar system of claim 6, wherein the separate drive signals have the same frequency and respective adjustable phases resulting in adjustable beamforming of sound projected into the water.

9. The sonar system of claim 8, wherein the adjustable beamforming is configured to steer acoustic beams generated by the acoustic projector.

10. The sonar system of claim 1, wherein the outer structure comprises two tow cable retention structures for receiving respective retention features on a tow cable.

11. The sonar system of claim 1, wherein the movable arm is configured to move the two tow cable retention features into respective ones of the two tow cable retention structures of the outer structure while the tow cable is being towed through the water, the towing resulting in tension on the tow cable.

12. The sonar system of claim 11, wherein the tow cable comprises a first part and a second different part coupled to the first part, the first part comprising communication couplings to the acoustic projector and the second part comprising communication couplings to a receiving array.

13. The sonar system of claim 12, wherein the first part of the tow cable comprises a connector for coupling to the tow body.

14. The sonar system of claim 12, further comprising a winch, wherein the winch comprises first and second drums coupled together, wherein the first drum is configured to receive the first part of the tow cable and the second drum is configured to receive the second part of the tow cable.

15. The sonar system of claim 14, wherein the winch comprises an opening between the first drum and the second drum, the opening configured to allow the tow cable to pass from the first drum to the second drum as the tow cable is being spooled and to pass from the second drum to the first drum as the tow cable is being unspooled.

16. The sonar system of claim 12, wherein the support structure comprises a release mechanism configured to release the tow body into the water, wherein the outer structure of the tow body comprises at least one skid rail configured to protect the acoustic projector upon the release of the tow body from the support structure.

17. A method used in a towed sonar system, comprising:
coupling a tow body having an acoustic projector to a tow cable, wherein the coupling the tow body comprises:
attaching the tow body to the tow cable while the tow cable is being towed through water, while the tow cable is under tension, and while the tow body in out of the water, wherein then attaching comprises:
moving a movable arm holding the tow body toward the tow cable so that two tow cable retention structures on the tow body engage two tow cable retention features on the tow cable, wherein the method further comprises
deploying the tow body into the water while the tow body is attached to the tow cable and while the tow cable is under tension;
towing the tow body through the water with the tow cable; and
rotating the acoustic projector in a vertical plane while the tow body is being towed through the water.

18. The method of claim 17, further comprising:
adjustably beamforming with the acoustic projector to provide different beampatterns depending upon an orientation of the acoustic projector.

19. The sonar system of claim 4, further comprising an angle sensor coupled to sense an orientation of the major axis of the acoustic projector relative to vertical.

20. A sonar system, comprising:
a tow body for towing through the water, the tow body comprising:
an outer structure having a length along a major axis and a width less than the length of the outer structure; and
an acoustic projector coupled to the outer structure and having a length along a major axis and a width less than the length of the acoustic projector; wherein the sonar system further comprises:
a tow cable comprising two tow cable retention features, wherein the outer structure comprises two tow cable retention structures for receiving the two tow cable retention features, respectively; and
a support structure for coupling to a ship and for holding the tow body before it is deployed into the water, wherein the support structure comprises a movable arm, wherein, by movement of the movable arm, the movable arm is configured to guide the two tow cable retention features into respective ones of the two tow cable retention structures of the outer structure.

21. The sonar system of claim 20, further comprising an actuator mechanism coupled between the acoustic projector and the outer structure and configured to rotate the acoustic projector in a vertical plane about the axle.

22. The sonar system of claim 21, wherein the actuator mechanism is configured to rotate the major axis of the acoustic projector between horizontal and vertical orientations, in both of two rotation directions, while the tow body is being towed through the water.

23. The sonar system of claim 21, wherein the actuator mechanism is configured to rotate the major axis of the acoustic projector between horizontal and vertical orientations, in both of two rotation directions, while the tow body is being towed through the water, such that the acoustic projector is acoustically operational in the horizontal and vertical orientations while the tow body is being towed through the water.

24. A method used in a towed sonar system, comprising:
coupling a tow body having an acoustic projector to a tow cable, wherein the coupling the tow body comprises:
attaching the tow body to the tow cable while the tow cable is being towed through water, while the tow cable is under tension, and while the tow body in out of the water, wherein then attaching comprises:
moving a movable arm holding the tow body toward the tow cable so that two tow cable retention structures on the tow body engage two tow cable retention features on the tow cable, wherein the method further comprises:
deploying the tow body into the water while the tow body is attached to the tow cable and while the tow cable is under tension;
towing the tow body through the water with the tow cable.

25. The method of claim 24, further comprising rotating, with an actuator mechanism, the acoustic projector in a vertical plane while the tow body is being towed through the water.

26. The method of claim 24, further comprising rotating the acoustic projector in a vertical plane, in both of two rotation directions, while the tow body is being towed through the water.

27. The method of claim 24, further comprising rotating the acoustic projector in a vertical plane, in both of two rotation directions, while the tow body is being towed through the water, such that the acoustic projector is acoustically operational in the horizontal and vertical orientations while the tow body is being towed through the water.

* * * * *